(12) United States Patent
Siggel et al.

(10) Patent No.: US 6,680,116 B2
(45) Date of Patent: Jan. 20, 2004

(54) LUMINESCENT FIBER PRODUCTION THEREOF AND USE THEREOF

(75) Inventors: Alfred Siggel, Seelze (DE); Thomas Potrawa, Seelze (DE); Hermann Langheim, Garbsen (DE)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/300,328

(22) Filed: Nov. 20, 2002

(65) Prior Publication Data

US 2003/0072940 A1 Apr. 17, 2003

Related U.S. Application Data

(62) Division of application No. 09/626,431, filed on Jul. 27, 2000, now Pat. No. 6,514,609, which is a continuation of application No. PCT/EP99/00430, filed on Jan. 25, 1999.

(30) Foreign Application Priority Data

Jan. 23, 1998 (DE) .......................................... 198 02 588

(51) Int. Cl.$^7$ .................................................. D01F 8/00
(52) U.S. Cl. ........................ 428/370; 428/372; 428/373; 106/204.01; 252/301.36
(58) Field of Search ................................. 428/373, 372, 428/370; 106/204.01; 252/301.36

(56) References Cited

U.S. PATENT DOCUMENTS

| 4,999,243 | A | * | 3/1991 | Maeda ........................ 428/373 |
| 5,770,110 | A | * | 6/1998 | Schrell et al. .......... 252/301.36 |
| 6,162,539 | A | * | 12/2000 | Shimizu et al. .............. 428/373 |
| 6,514,609 | B1 | * | 2/2003 | Siggel et al. ................ 428/372 |

FOREIGN PATENT DOCUMENTS

| DE | 19802588 A | * | 1/2000 |
| GB | 2306486 | * | 7/1997 |

* cited by examiner

Primary Examiner—N. Edwards
(74) Attorney, Agent, or Firm—Colleen D. Szuch

(57) ABSTRACT

A luminescent fiber is described comprising at least one fiber-forming material with at least one inorganic luminophor pigment dispersed therein, characterized in that the inorganic luminophor pigment has an average particle size of about 1 to 30 pm, and wherein the luminophor pigment produces at least in part a phosphorescence or fluorescent effect on excitation by radiation.

17 Claims, No Drawings

LUMINESCENT FIBER PRODUCTION THEREOF AND USE THEREOF

CROSS-REFERENCE TO RELATED APPLICATION

This application is a continuation of PCT Application No. PCT/EP99/00430, filed Jan. 25, 1999, which claims the benefit of German National Application No. DE 1980288.2, filed Jan. 23, 1998.

This invention relates to luminescent fiber comprising at least one fiber-forming material having at least one inorganic luminophor pigment dispersed therein.

Fibers which are luminescent because they have been dyed with soluble organic ultraviolet-active dyes are known. Such fibers, which are based on polyamide or viscose, are used for example in documents of value to prove their authenticity. These fibers emit green, yellow, red or blue light on stimulation by UV radiation, depending on the dye or dye mixture used. However, such organically dyed fibers have the disadvantage of low lightfastness, and organic ultraviolet-active dyes provide neither infrared luminescence nor phosphorescence. Because of these disadvantages, such fibers have no utility for the security marking of documents of value.

DE-A-19 539 315 describes luminescent regenerated cellulose fiber containing inorganic luminophors having an average particle size of less than 1 µm, especially of 0.5 to 0.7 µm, in an amount of 0.01 to 5% by weight. These inorganic luminophors are phosphates, tungstates, oxides, silicates and aluminates of the alkaline earth metals, of the transition group elements or of the rare earths or halides of the alkali or alkaline earth metals, each doped with manganese, antimony, tin, lead, copper, silver or rare earths. These inorganic luminophors are superior to organic dyes with regard to lightfastness, but produce neither phosphorescence nor infrared luminescence effects and lead only to low luminescence intensities, which may lead to uncertain results, for example, in the examination of documents of value marked with such luminophors.

It is an object of the present invention to provide luminescent fiber, especially for use in documents of value, which provides fluorescence or phosphorescence effects, possesses high lightfastness and exhibits intensive luminescence effects in the visible and/or nonvisible wavelength range.

This object is achieved according to the invention by luminescent fiber comprising at least one fiber-forming material with at least one inorganic luminophor pigment dispersed therein, when the inorganic luminophor pigment has an average particle size of 1 to 30 µm.

The intensification of luminescence through the choice of certain average particle sizes for the luminophor pigment is surprising, since DE-A-19 539 315 states expressly that the inorganic luminophors should advantageously have an average particle size of less than 1 µm and in the discussion of the background art cites the Japanese patent publication No. 87-327 866 which says that yttrium oxysulfide luminophor pigment loses its luminescence effect on grinding to particle sizes of less than 1 µm.

The choice of fiber-forming material in the invention is not subject to any specific restriction, save that it be miscible with the luminophor pigments of the claimed particle size. The fiber-forming material in the luminescent fiber of the invention is preferably viscose, since thusly produced luminescent fiber is highly compatible with the customary paper stocks based on cellulose and printable by various printing processes, such as offset, so that there are no problems with using such fiber for marking papers, specifically documents of value. The fiber of the invention may also be used in the textile sector, for the covert or overt identification of high value branded products. The intensive luminescence attainable together with high lightfastness makes the luminescent fiber of the invention particularly useful for the security marking of any fiber-containing articles particularly textiles, papers and particularly documents of value.

The inorganic luminophor pigments used according to the invention have an average particle size of preferably 2 to 30 µm, more preferably 4 to 20 µm, especially 5 to 20 µm. The use level in luminescent fiber or luminophor pigments used according to the invention can vary within wide limits and is advantageously in the range from 0.01 to 50% by weight, preferably more than 5% by weight to 50% by weight, based on the water-free total fiber mass. Preference is given to percentages ranging from 7 to 40%, especially from 10 to 20%, by weight, based on the water-free total fiber mass.

Inorganic luminophor pigments particularly preferred for use in the invention produce a phosphorescence effect on excitation by visible or ultraviolet radiation. For luminophor pigments to produce a phosphorescence effect their luminescence must involve energy-storing processes, so that the luminescence is at least partly still present after the excitation has ended. The phosphorescence effect has the advantage of being a simple way to ensure machine readability and of permitting the separation in space of the site of excitation from the site of detection. The phosphorescence effect may be excited even by white light, so that visual observation in a darkened environment is sufficient for detection. This facilitates the checking of any security coding of products, such as textiles, and the checking of documents of value.

The invention advantageously utilizes inorganic luminophor pigments which on excitation by visible or ultraviolet radiation in the wavelength range from 200 to 680 nm will, after the excitation has ended, emit visible light having spectral fractions in the wavelength range from 380 to 680 nm.

It is particularly advantageous to use zinc sulfides, zinc cadmium sulfides, alkaline earth metal aluminates, alkaline earth metal sulfides or alkaline earth metal silicates, all doped with one or more transition metal elements or lanthanoid elements. For instance, copper-doped zinc sulfides produce green phosphorescence, alkaline earth metal aluminates, alkaline earth metal sulfides or alkaline earth metal silicates doped with lanthanoid elements produce green, blue or red phosphorescence, and copper-doped zinc cadmium sulfides produce yellow, orange or red phosphorescence, depending on the cadmium content.

Preference is given to alkaline earth metal aluminates doped with europium and alkaline earth metal aluminates which, as well as europium, include a further rare earth element as coactivator, especially dysprosium. Particularly useful alkaline earth metal aluminates of the abovementioned kind are described in EP-A-0 622 440 and U.S. Pat. No. 5,376,303, which are both incorporated herein in full by reference.

Another group of inorganic luminophor pigments useful in the invention produce a fluorescence effect on excitation by ultraviolet radiation. These pigments emit green, yellow or blue light on stimulation by ultraviolet radiation. The presence of UV-active luminescence-capable materials is verifiable using simple commercial UV light sources. This may constitute an advantage in use, but in other cases, such as documents of value, constitutes a disadvantage, since the presence of a security feature is readily apparent to unauthorized persons.

Advantageous luminophor pigments among this group of luminophor pigments emit visible light having spectral fractions in the wavelength range from 380 to 680 nm on excitation by ultraviolet radiation in the wavelength range from 200 to 380 nm. Particularly advantageous such luminophor pigments are zinc sulfides, oxides, oxysulfides, silicates or aluminates, all doped with one or more transition metal elements or lanthanoid elements. For instance, copper-doped zinc sulfides produce green fluorescence, silver-doped zinc sulfides blue fluorescence, and oxides, oxysulfides, silicates or aluminates doped with transition metals or lanthanoids produce green, blue or red fluorescence.

A further preferred group of luminophor pigments to be used according to the invention is the group of the infrared-active luminophor pigments, i.e. pigments comprising infrared-active luminophors having a luminescence process involving at least partly long-wave, infrared radiation having wavelengths above 680 nm. These include not only the anti-Stokes luminophors, which on excitation by infrared radiation above 680 nm emit luminescence radiation having a shorter wavelength below 680 nm, but also the Stokes luminophors, which on excitation by radiation of a comparatively short wavelength below 680 nm emit infrared radiation having a wavelength above 680 nm. Such anti-Stokes luminophors are described inter alia in WO 98/39392, likewise incorporated herein in full by reference, and the prior art cited therein. This group of luminophor pigments also includes infrared-infrared converting luminophors, which on excitation by infrared radiation emit infrared radiation of a different wavelength.

The process for producing the luminescent fiber of the invention is simple in that it merely requires that the activator-doped inorganic luminophor pigment be added to the fiber-forming material or a solution thereof and fiber be spun therefrom. For example, the doped pigment is added to viscose dope, and the viscose dope is spun into fiber by the viscose spinning process. It is similarly possible to add the doped pigments to a cellulose solution and spin fibers therefrom, for example according to the cupro process, the lyocell process or according to a process involving low-substituted cellulose ethers. An example of a useful solvent is N-methylmorpholine oxide/water.

Combined with a suitable source of excitation, such viscose fiber can be used for the security marking of products, for authentication and for controlling automatic recognition processes for textiles, documents of value and security papers in the widest sense. It is necessary in this connection to use materials and security features that are difficult to forge and are producible in combination with other security features. As well as providing for simple visual inspection by anyone, it is also desirable that, if necessary and depending on the level of security, security features be only clearly detectable by a sophisticated analytical effort. Luminescent fiber permits a localized, high signal intensity and hence a better signal-to-noise ratio compared with uniform applications of corresponding luminophor pigments by means of customary security printing technologies. The long-term objective in the production of security features is the technical scientific lead over the forger and the reduced motivation to forge because of complexity associated with the security feature.

The fiber of this invention offers great application benefits with regard to simple, rapid, contactless and economical verification, machine readability, compatibility with other effects, specific excitation by different wavelengths and the various luminescence colors on excitation by different wavelengths. The materials of the invention are useful for producing uncopyable textiles, documents of value and security papers, are highly compatible with the raw materials based on cellulose and are printable by various printing processes, specifically die stamping and offset printing, providing for possible combinations with security printing inks or with other security features.

Combined with a suitable source of excitation, the luminescent viscose fiber of the invention that provides a phosphorescence effect is for example useful for the overt security marking of products and their authentication. The phosphorescence-effect fiber of the invention offers substantial benefits for this application with regard to simple, rapid, contactless and economical verification by anyone, since the necessary excitation of the phosphorescence effect is possible with just natural or artificial white light and verification of the security feature is possible just by visual inspection in a darkened environment. The use of a photodetector, moreover, provides for simple machine readability in that the phosphorescence effect also permits the site of excitation to be separated in space from the site of verification.

The inventive fiber which provides a fluorescence but no phosphorescence effect likewise permits inspection by anyone, but the UV excitation needed for detection is sufficient to increase the difficulty of detection and therefore constitutes a higher security level.

The use of infrared-active luminophors for marking and forgeryproofing documents of value constitutes a still higher security level in that the low signal intensity of infrared-active luminophor pigments very substantially increases the analytical effort required for excitation and verification and makes it difficult even to detect the existence of a corresponding security device.

EXAMPLE 1

A spinning solution containing 9 parts by weight of cellulose is admixed at room temperature with a dispersion of a luminophor pigment formed by stirring 100 parts by weight of a zinc sulfide having an average particle size of 5 $\mu$m and doped with 400 ppm of copper into a solution of polyvinyl alcohol, water and Orotan wetting agent to form a dispersion composed of 22 parts by weight of the monodisperse luminophor pigment, 2.8 parts by weight of polyvinyl alcohol and 0.05 parts by weight of Orotan. The dispersion is filtered through a commercially available sieve having a mesh size of 40 $\mu$m, mixed with 10,000 parts by weight of spinning solution and spun under plant-customary conditions into an acidic coagulation bath. The fiber obtained on drying has a green luminescence color on excitation by ultraviolet radiation.

EXAMPLE 2

Example 1 is repeated by mixing 100 parts by weight of a zinc sulfide having an average particle size of 5 $\mu$m and doped with 400 ppm of copper directly with 10,000 parts by weight of spinning solution, filtering through a commercially available sieve having a mesh size of 40 $\mu$m and spinning under plant-customary conditions into an acidic coagulation bath. The fiber obtained on drying has a green luminescence color on excitation by ultraviolet radiation.

EXAMPLE 3

Example 1 is repeated by mixing 225 parts by weight of a zinc sulfide having an average particle size of 5 $\mu$m and doped with 400 ppm of copper in the form of a dispersion with 10,000 parts by weight of spinning solution and spinning under plant-customary conditions into an acidic coagulation bath. The fiber obtained on drying has a green luminescence color of higher intensity than Example 1 on excitation by ultraviolet radiation.

EXAMPLE 4

Example 1 is repeated by mixing 100 parts by weight of a zinc sulfide having an average particle size of 20 μm and doped with 80 ppm of copper and 5 ppm of cobalt in the form of a dispersion with 10,000 parts by weight of spinning solution and spinning under plant-customary conditions into an acidic coagulation bath. The fiber obtained on drying has a green luminescence color on excitation by ultraviolet radiation and produces green phosphorescence on excitation by white light.

EXAMPLE 5

Example 1 is repeated by mixing 100 parts of weight of an yttrium oxide sulfide having an average particle size of 10 μm and doped with 12% of ytterbium and 8% of erbium in the form of a dispersion with 10,000 parts by weight of spinning solution and spinning under plant-customary conditions into an acidic coagulation bath. The fiber obtained on drying has a green luminescence color on excitation by infrared radiation.

What is claimed is:

1. A luminescent fiber comprising at least one fiber-forming material with at least one inorganic luminophor pigment dispersed therein, characterized in that the inorganic luminophor pigment has an average particle size of about 1 to 30 microns.

2. The luminescent fiber according to claim 1, wherein the inorganic luminophor pigment has an average particle size of about 4 to 20 microns.

3. The luminescent fiber according to claim 2, wherein the inorganic luminophor pigment has an average particle size of about 5 to 20 microns.

4. The luminescent fiber according to claim 1, wherein the inorganic luminophor pigment is present in an amount of more than about 5 to 50%, by weight, based on the water-free total fiber mass.

5. The luminescent fiber according to claim 4, wherein the inorganic luminophor pigment is present in an amount of more than about 7 to 40%, by weight, based on the water-free total fiber mass.

6. The luminescent fiber according to claim 5, wherein the inorganic luminophor pigment is present in an amount of about 10 to 20%, by weight based on the water-free total fiber mass.

7. The luminescent fiber according to claim 2, wherein the inorganic luminophor pigment is present in an amount of more than 5 to 50%, by weight, based on the water-free total fiber mass.

8. The luminescent fiber according to claim 1, wherein the fiber-forming material is viscose.

9. The luminescent fiber according to claim 1, wherein the fiber-forming material is viscose, the inorganic luminophor pigment has an average particle size of about 5 to 20 microns, and wherein the inorganic luminophor pigment is present in an amount of more than 5 to 50%, by weight, based on the water-free total fiber mass.

10. The luminescent fiber according to claim 1, wherein the luminophor pigment produces at least in part a phosphorescence effect on excitation by visible or ultraviolet radiation.

11. The luminescent fiber according to claim 10, wherein the fiber-forming material is viscose, the inorganic luminophor pigment has an average particle size of about 5 to 20 microns, and wherein the inorganic luminophor pigment is present in the amount of more than 5 to 50%, by weight, based on the water-free total fiber mass.

12. The luminescent fiber according to claim 10, wherein the luminophor pigment is selected from the group consisting of zinc sulfides, zinc cadmium sulfides, alkaline earth metal aluminates, alkaline earth metal sulfides or alkaline earth metal silicates, each doped with one or more transition metal elements or lanthanoid elements.

13. The luminescent fiber according to claim 1, wherein the inorganic luminophor pigment produces at least in part a fluorescence effect on excitation by ultraviolet radiation.

14. The luminescent fiber according to claim 13, wherein the fiber-forming material is viscose, the inorganic luminophor pigment has an average particle size of about 5 to 20 microns, and wherein the inorganic luminophor pigment is present in an amount of more than 5 to 50% by weight, based on the water-free total fiber mass.

15. The luminescent fiber according to claim 13, wherein the luminophor pigment consists of zinc sulfides, oxides, oxysulfides, silicates or aluminates, each doped with one or more transition metal elements or lanthanoid elements.

16. The luminescent fiber according to claim 1, wherein the inorganic luminophor pigment is at least in part excitable by infrared radiation.

17. The luminescent fiber according to claim 16, wherein the fiber-forming material is viscose, the inorganic luminophor pigment has an average particle size of about 5 to 20 microns, and wherein the inorganic luminophor pigment is present in an amount of more than 5 to 50%, by weight, based on the water-free total fiber mass.

* * * * *